Dec. 14, 1965   E. S. WUERTZ   3,222,954
PLANETARY SPEED-REDUCER
Filed Aug. 9, 1963   3 Sheets-Sheet 1

INVENTOR.
Emil S. Wuertz
BY
ATT'YS

Dec. 14, 1965  E. S. WUERTZ  3,222,954
PLANETARY SPEED-REDUCER
Filed Aug. 9, 1963  3 Sheets-Sheet 2

United States Patent Office 3,222,954
Patented Dec. 14, 1965

3,222,954
PLANETARY SPEED-REDUCER
Emil S. Wuertz, Hingham, Mass., assignor to The Murray Company of Texas, Inc., Dallas, Tex., a corporation of Delaware
Filed Aug. 9, 1963, Ser. No. 301,001
1 Claim. (Cl. 74—801)

This invention pertains to reduction gearing, in particular gearing of the planetary type and more especially to reduction gearing of such design that it may be installed as a unit within a rotary part which is to be driven, for example, a conveyor drum.

In accordance with the present invention, this reducton gearing comprises a cylindrical housing which may be fitted within and pinned, bolted or otherwise fixed to a hollow conveyor drum, pulley, sprocket or the like, and having bearings at its opposite ends for an input shaft and a fixed output shaft respectively, and wherein all of the speed-reducing elements are concealed within the housing.

Among the objects of the invention are to provide a reduction gearing of simple construction comprising but few moving parts and wherein a plurality of said parts are of identical size and shape thus reducing production costs. A further object is to provide reduction gearing of the above type with provision whereby lubricant is recirculated through the gearing in response to the rotation of the housing. A further object is to provide reduction gearing of the above type wherein lubricant for some of the parts may be provided by the employment of non-metallic elements impregnated with lubricating material. A further object is to provide reduction gearing of this type of a design such that it becomes practical to employ gear elements of non-metallic material, for example nylon or other wear-resistant synthetics. A further object is to provide a speed-reducer wherein the cylindrical housing and the input shaft and output or supporting shaft are coaxial thus making it possible to use the reduction gearing in any desired position, that is to say, with the axis of the housing horizontal, vertical or inclined. A further object is to provide a reduction gearing of a type such that annular gears, sprockets, pulleys, and so forth, may be secured in concentric relation to the outside periphery of the housing.

In the attainment of the above objects, the present invention provides reduction gearing comprising a two-piece hollow cylindrical housing wherein the major portion of the peripheral wall and one end wall are desirably integral, while the opposite end wall is an independent part which, in the completed device, is rigidly secured to the housing proper, for example by means of cap screws. The inner surface of the housing proper has gear teeth constituting an axially elongate internal gear. Interior annular surfaces, at opposite ends of the housing, are so designed as to urge lubricant toward the center of the intervening cavity by centrifugal action as the housing is rotated. The removable end or cover member is provided with a tubular hub which houses the outer race of a conventional ball bearing in which the input shaft turns, while the opposite or closed end of the housing is provided with a bearing for the "output" or stationary supporting shaft.

Other and further objects and advantages of the invention will be pointed out in the following more detailed description and by reference to the accompanying drawings wherein.

Figure 1:
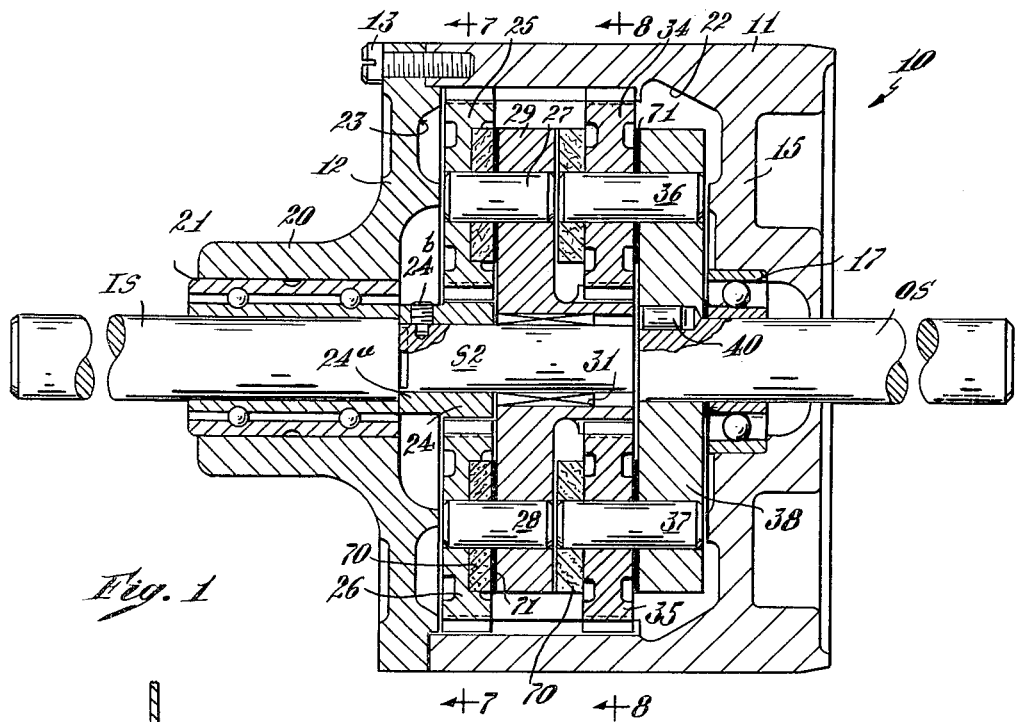
FIG. 1 is a diametrical section illustrating the speed-reducer of the present invention.

Referring to the drawings (FIG. 1), the numeral 10 indicates generally the speed-reducer of the present invention, showing the latter in associattion with an input shaft IS and an output shaft OS. This speed-reducer, referring to FIG. 1, comprises a hollow housing of cylindrical external contour which may, for example, consist of a unitary casting 11 constituting the main or body portion of the housing and a removable end member or cover 12—these parts being held in assembled relation by suitable fastening means, for example cap screws 13, passing through holes 13a (FIG. 4) in the cover member 12 and engaging screw-threaded bores 13b (FIG. 3) in the edge of the main member 11.

Figures 3, 4:
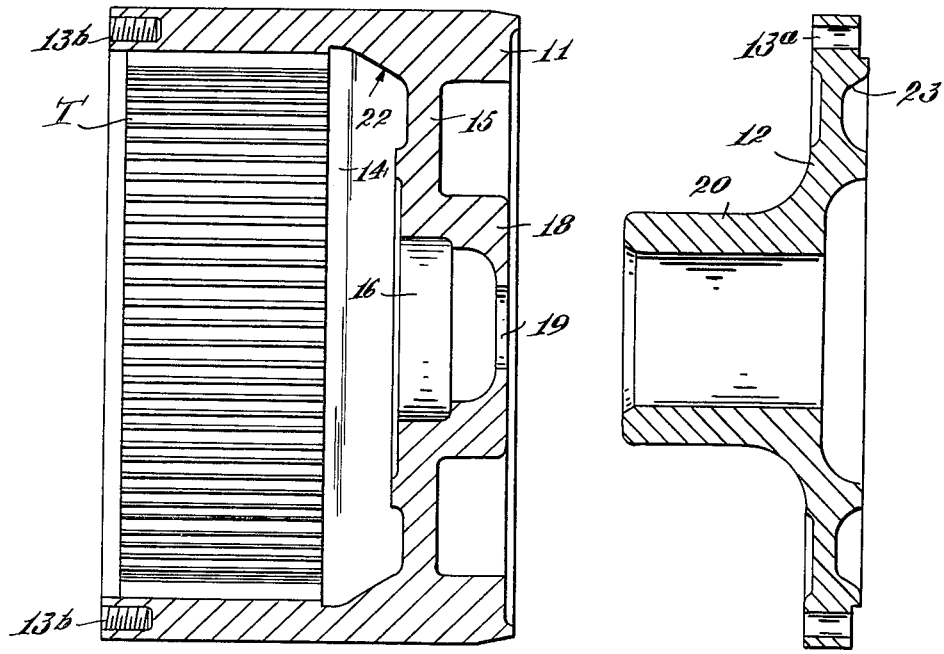
FIG. 3 is a diametrical section showing the body portion of the housing of the speed-reducer, omitting the internal parts.
FIG. 4 is a diametrical section showing the removable end member or cover of the housing of the speed-reducer.

This main member 11 has an interior chamber 14 (FIG. 3) and an integral web 15 defining the right-hand wall of this chamber. The web 15 has a central cylindrical bore 16 for the reception of a conventional ball bearing 17 (FIG. 1) for the output shaft OS. As shown in FIG. 3, the web 15 comprises a central boss 18 whose outer end face is substantially flush with the right-hand end surface of the member 11 and which has a central bore 19 of slightly larger diameter than the output shaft OS and through which the output shaft passes. The cover member 12 is provided with an integral sleeve portion 20 (FIG. 4) within which there is fixed the outer race (FIG. 1) of a suitable ball bearing 21 in which the input shaft IS is journaled. The member 11 has an internal annular surface 22 (FIGS. 1 and 3) which slopes outwardly at an angle of approximately 30° with the axis of the output shaft, while the cover member 12 has a similarly internal annular sloping surface 23 (FIGS. 1 and 4) also sloping upwardly and outwardly but oppositely to the surface 22. These surfaces 22 and 23 function, when the device is in use, to cause lubricant, urged outwardly by centrifugal force, to move toward the center of the cavity so as effectively to lubricate the gear elements.

Figures 5, 6:
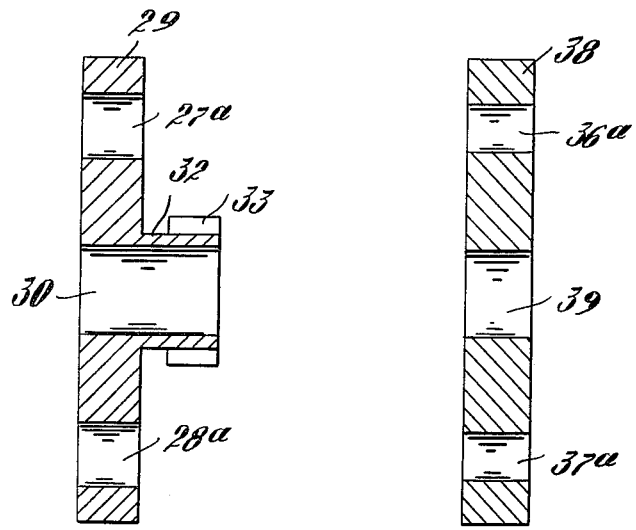
FIG. 5 is a diametrical section showing the planet gear carrier for the first stage of reduction, separated from other parts.
FIG. 6 is a diametric section through the planet gear carrier for the second stage of reduction.
Figure 7:
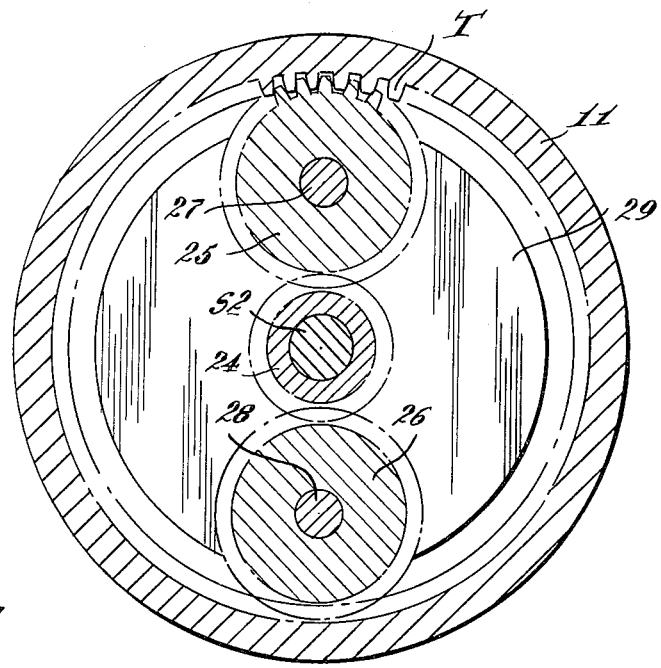
FIG. 7 is a transverse section substantially on the line 7—7 of FIG. 1.
Figure 8:
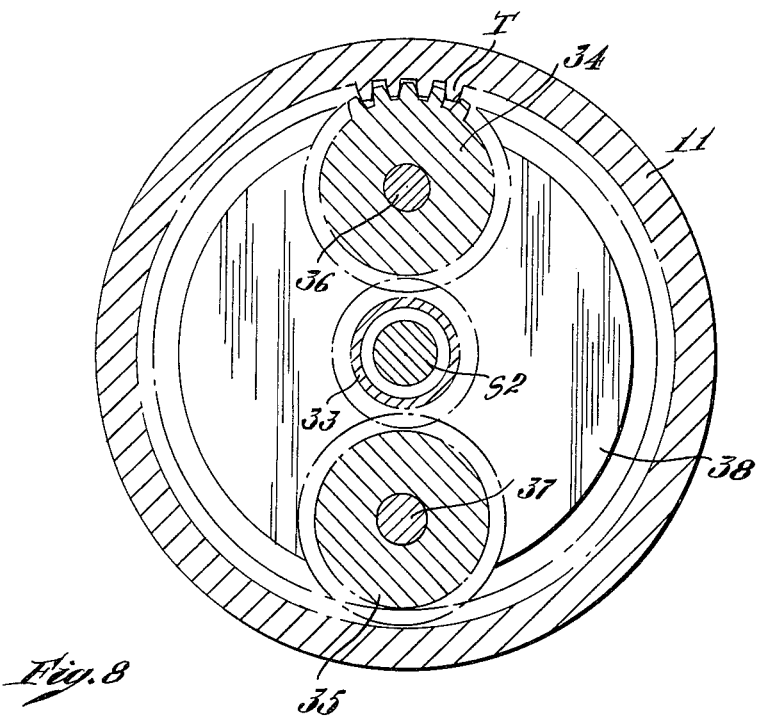
FIG. 8 is a transverse section substantially on the line 8—8 of FIG. 1.

The input shaft IS comprises an integral portion $S^2$ of reduced diameter to the right of the bearing 21, as viewed in FIG. 1, and on this reduced portion there is secured a pinion 24 having a shank portion 24a which receives a set screw 24b by means of which this pinion is fixed to the shaft. This pinion 24 meshes with two planetary gears 25 and 26 (FIGS. 1 and 7) which turn on stud shafts 27 and 28 respectively, fixed in a rotary carrier 29 (FIGS. 1 and 5). The teeth of both planetary gears 25 and 26 also mesh with teeth T (FIG. 3) on the inner surface of the housing member 11—these teeth being elongate axially of the housing and being cut in a cylindrical portion of the wall of the chamber 14. The carrier 29 has a central bore 30 (FIG. 5) and diametrically opposite bores 27a and 28a in which the stud shafts 27 and 28 are fixed. The bore 30 of the carrier 29 is slightly larger than the diameter of the part 24 of the input shaft $S^2$ and within this bore there is arranged an antifriction bearing sleeve 31 (FIG. 1) on which the carrier turns. The carrier 29 is provided with integral tubular hub portion 32 (FIG. 5) provided with an integral spur pinion 33 which meshes with two planetary gears 34 and 35 (FIG. 1) respectively, which turn on stud shafts 36 and 37 which are fixed in diametrically opposite bores 36a and 37a (FIG. 6) in a second carrier 38—this latter carrier having a central bore 39 for the reception of the inner end of the output shaft OS—the carrier 38 being keyed to the output shaft by a pin 40 (FIG. 1) or equivalent means. The teeth of the planetary gears 34 and 35 mesh with the same internal teeth T in the wall of the chamber 14 as do the teeth of the planetary gears 25 and 26. Since the planetary gears of both sets mesh with the same teeth T on the internal surface of the housing, all of these planetary gears may be of the same pitch and thus may be alike—in this way reducing cost of production.

While each set of planetary gears, as here illustrated, comprises but two gears at diametrically opposite sides of the housing, it is contemplated that each set might comprise three gears symmetrically arranged or even four gears equally spaced about the periphery of the housing.

Figure 2:
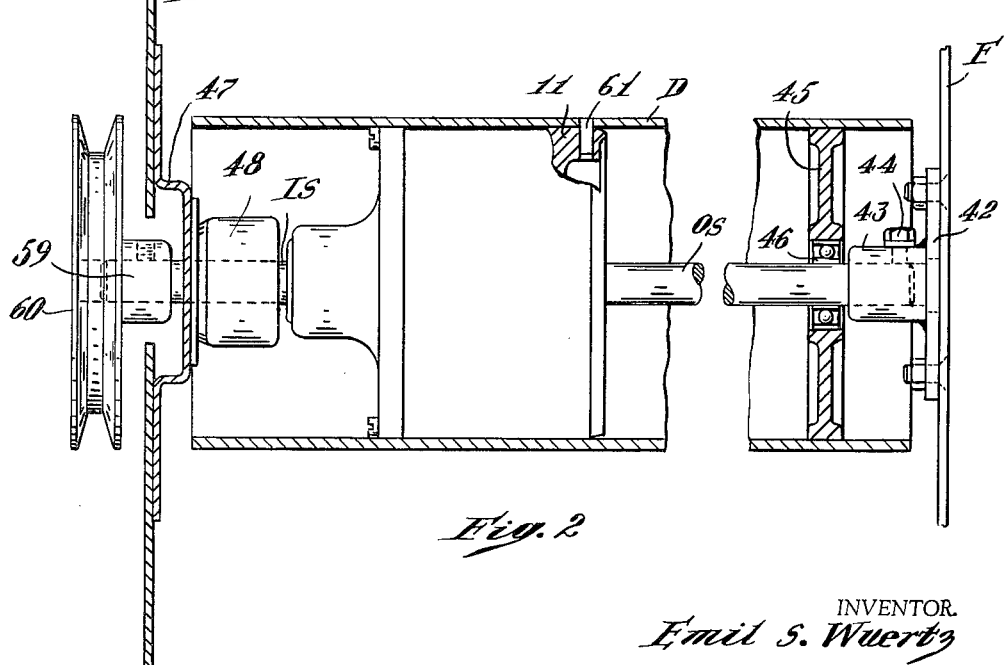
FIG. 2 is a diametrical section through a cylindrical pulley or drum having the speed-reducer of the present invention installed within the drum intermediate the ends of the latter.

Referring to FIG. 2, the speed-reducer of the present invention is shown as arranged to drive an elongate hollow cylindrical drum D such, for example, as may be employed for driving a wide conveyor belt. This drum may, for example, be a length of seamless, drawn steel tubing of uniform diameter. Spaced members F and F¹ of the frame of the conveyor apparatus are indicated in FIG. 2, with the drum D interposed between them. To the frame member F there is bolted a flange member 42 having a hub portion 43 having a socket which receives the outer end of the output shaft OS, which is fixed in position in the socket by a set screw 44 or other functionally equivalent device so that the "output" shaft, in this assembly, is not permitted to rotate. The drum D is provided near its right-hand end, as viewed in FIG. 2, with a transverse spider 45 having a central annular hub providing a housing for a ball bearing 46 of conventional type thereby suporting this end portion of the drum for rotation.

The frame member F¹ is provided at its inner side with a supporting bracket 47 which may be welded to the frame and to which is fixedly secured the housing 48 of a ball bearing for the input shaft IS. This input shaft extends outwardly beyond the frame member F¹ and to this end of the shaft there is keyed, or otherwise secured, a drive element—for example, a pulley, sprocket wheel, or the like. As here shown, the hub 59 of a pulley 60 is fixed to the shaft, this pulley being of the type designed to receive a V-belt driven by an electric motor (not shown). However, any appropriate drive means may be employed.

The main member 11 of the housing of the speed-reduction device of the present invention is positioned at a desired point intermediate the ends of the drum D, the lengths of the shafts IS and OS being predetermined in accordance with the length of the drum D and the location within the drum at which the speed-reducing unit 10 is to be installed. Having once located the speed-reducing unit within the drum, the speed-reducing unit is then securely fixed to the drum as, for example, by means of pins 61 (FIG. 2) extending radially through the thickness of the shell of the drum and into suitable radial bores in the housing member 11.

As thus arranged and noting that the output shaft OS, in this particular instance, does not turn but constitutes a support and serves to prevent rotation of the carrier 38 for the planetary gears 34 and 35, it will be understood that rotation of the pulley 60 turns the input shaft IS and with it the pinion 24 which by meshing with the planetary gears 25 and 26, causes these gears to turn thus turning the speed-reducer housing 11, 12 while, at the same time, turning the carrier 29 which supports the planetary gears 25 and 26. The rotation of this carrier 29 is accompanied by a rotation of the pinion 33 (which is integral with this carrier) and thus, in turn, rotates the planetary gears 34 and 35 whose teeth mesh with the teeth T at the interior of the housing, but since the output shaft is immovable the reaction of these planetary gears 34 and 35, in contact with the teeth of the housing, does not produce any rotational motion of the carrier 38, but provides a second stage of speed-reduction between the input shaft IS and the housing 11, 12 of the speed-reducing unit.

By this means a very high reduction in speed is provided by the use of a very simple device of small dimensions which may readily be installed within a conveyor drive drum as illustrated in FIG. 2, or within the hub of a large sprocket or pulley. Thus the device is of wide application.

As the housing rotates, lubricant within the chamber 14 is urged outwardly by centrifugal action and is fed toward the planetary gears by the inclined surfaces 22 and 23.

It is obvious that by changing the relative dimensions of the housing member 11 and the planetary gears various degrees of reduction in speed may readily be obtained, and since all of the planetary gears are of the same size and pitch in a given reduction unit, and all engage the same internal gear, and as the other constituent parts of the device are of so simple construction and so easy to manufacture, this unit may be made at relatively low cost as compared with many prior devices designed for this general purpose and, in particular, those wherein worm or similar gearing is a requisite.

The boss 18 with its central opening 19, as shown in FIG. 3 of the drawings, functions to assist in supporting the output shaft of the unit before the unit is assembled with the drum or other device with which it is to be used—the size of the opening 19 being such that, during the normal use of the apparatus, the shaft does not contact the boss 18. However, before the device is assembled with a driven part, the output shaft is not only supported by the ball bearing 17 but also by the edge of the bore 19.

Antifriction washers 70, for example of fiber containing a lubricating medium, may be assembled with each planetary gear stub and the planetary gears may be of some wear-resistant material, for example nylon. Moreover, the studs themselves may be of powdered metal composition containing lubricant. Shims 71 of antifriction material are desirably interposed between the end faces of the pinions and the adjacent carriers.

While one desirable embodiment of the invention has herein been disclosed by way of example, it is to be understood that the invention is broadly inclusive of any and all modifications falling within the scope of the appended claims.

I claim:

The combination with a frame comprising spaced vertical members, a bracket fixed at the inner side of one of said frame members, a ball bearing carried by said bracket, a power input shaft turning in said bearing and which extends outwardly through an opening in the bracket and through an aperture in said last-named frame member, a drive pulley fixed to the outboard end of said input shaft, a stationary shaft coaxial with the input shaft, a part fixed to the other frame member having a socket within which one end of said stationary shaft is fixed and rigidly secured, a cylindrical drum of a length to extend substantially from one frame member to the other, said drum being coaxial with said shafts and open at both ends, the drum having a transverse internal spider spaced from one end, said spider comprising a hub portion which houses a ball bearing through which passes the stationary shaft, a speed-reducer unit within the drum and spaced from one end of the latter, said unit comprising a cylindrical hollow housing of an external diameter so as to fit snugly within the drum, the housing comprising a body portion having an integral web at one end provided with an axial opening for passage of the stationary shaft, and having a removable cover at its opposite end comprising an elongate hub portion, the body portion and cover member having internal annular surfaces operative, as the housing rotates during use, to cause lubricant, urged outwardly by centrifugal force, to move toward the central portion of the housing, the body portion of the housing being provided with integral elongated teeth constituting an internal gear, the housing having coaxial ball bearings at opposite ends respectively, the input shaft entering the housing through one of said bearings and the stationary shaft entering the housing through the other of said bearings, the proximate ends of said shafts being spaced apart, a pinion fixed to the input shaft within the housing and adjacent to the bearing for said shaft, a carrier coaxial with the input shaft and which is rotatable relatively to the latter, said carrier being located adjacent to the inner end face of the aforesaid pinion, a plurality of parallel stud shafts fixed to said carrier, a planetary pinion arranged to turn on each of said stud shafts, each planetary pinion meshing with the pinion on the input shaft and also with the teeth of said integral gear, a pinion coaxial with and fixed relatively to said carrier, a second carrier coaxial with the stationary shaft and fixed to the latter, said second carrier being located adjacent to the bearing through which the stationary shaft enters the housing, a plurality of parallel stud shafts fixed to the last-named carrier, and a planetary gear on each of the latter stud shafts, said last-named planetary gears meshing with the pinion fixed to the first carrier and also with the teeth of the internal gear, all of the planetary pinions having the same number of teeth and being of the same pitch diameter.

References Cited by the Examiner

UNITED STATES PATENTS

| | | | |
|---|---|---|---|
| 2,505,002 | 4/1950 | Orr | 74—801 |
| 3,122,945 | 3/1964 | Chung | 74—802 |

FOREIGN PATENTS

| | | |
|---|---|---|
| 1,142,169 | 3/1957 | France. |
| 1,249,299 | 11/1960 | France. |
| 622,453 | 11/1935 | Germany. |

OTHER REFERENCES

Zimmerli: "Designing Fabricated Nylon Parts," Machine Design, pp. 153–159, (March 1954), copy available in Group 340, 74—801.

DON A. WAITE, *Primary Examiner.*